US008070133B1

(12) United States Patent
Boor

(10) Patent No.: US 8,070,133 B1
(45) Date of Patent: Dec. 6, 2011

(54) FLYWHEEL AND CLUTCH LIFT

(76) Inventor: Dennis Boor, Kiowa, KS (US)

( * ) Notice: Subject to any disclaimer, the term of this patent is extended or adjusted under 35 U.S.C. 154(b) by 629 days.

(21) Appl. No.: 12/186,694

(22) Filed: Aug. 6, 2008

Related U.S. Application Data

(60) Provisional application No. 60/954,428, filed on Aug. 7, 2007.

(51) Int. Cl.
*B60P 1/48* (2006.01)

(52) U.S. Cl. ...................... 254/8 B; 254/2 B; 254/133 R

(58) Field of Classification Search .................. 254/8 B, 254/2 B, 8 R, 134, 133 R, 126, 103, 93 R, 254/89 H, 10 B
See application file for complete search history.

(56) References Cited

U.S. PATENT DOCUMENTS

| | | | | | |
|---|---|---|---|---|---|
| 3,931,956 | A | * | 1/1976 | Hawkins | 254/8 B |
| 4,645,181 | A | * | 2/1987 | Schapansky | 254/2 B |
| 4,793,592 | A | * | 12/1988 | Green et al. | 254/2 R |
| 4,796,861 | A | * | 1/1989 | Petty | 254/8 B |
| 4,899,985 | A | * | 2/1990 | Good | 254/8 B |
| 5,251,875 | A | | 10/1993 | Craychee et al. | |
| 6,122,811 | A | * | 9/2000 | Shirley | 29/281.1 |
| 7,347,409 | B2 | * | 3/2008 | Goza | 254/2 B |
| 7,434,783 | B2 | * | 10/2008 | Arzouman | 254/8 B |
| 7,717,401 | B2 | * | 5/2010 | Diaz | 254/133 R |
| 2006/0208240 | A1 | * | 9/2006 | Spittle et al. | 254/8 B |

* cited by examiner

*Primary Examiner* — Lee D Wilson

(74) *Attorney, Agent, or Firm* — Kenneth H. Jack; Davis & Jack, LLC

(57) ABSTRACT

A mechanical lift for raising, lowering, and positioning a flywheel or a clutch assembly, the mechanical lift incorporating a base, the base being configured as a mechanic's floor creeper; a boom arm mounted upon the base for motion between first and second positions, the boom arm extending upwardly from the base while in the second position, the boom arm being positioned downwardly from the second position while in the first position; a first hydraulic cylinder connected operatively to the boom arm, the first hydraulic cylinder being mounted for moving the boom arm between its first and second positions; a telescoping shaft and a second hydraulic cylinder actuating the telescoping shaft, the telescoping shaft being connected operatively to the boom arm; and a clutch or flywheel adapter fixedly attached to the boom arm.

16 Claims, 12 Drawing Sheets

FLYWHEEL AND CLUTCH LIFT

REFERENCE TO PENDING PROVISIONAL APPLICATION

This Non-Provisional Patent Application claims the benefit of and priority from the Aug. 7, 2007 filing of U.S. Provisional Patent Application No. 60/954,428 entitled “Flywheel and Clutch Lift”. The inventor under said Application No. 60/954,428 and under the instant application are one and the same person. The Specification and drawings of said Application 60/954,428 are substantially identical to those of the instant application.

FIELD OF THE INVENTION

This invention relates to apparatus adapted for raising, lowering, and positioning vehicle flywheels and clutches for assistance in installations and de-installations of vehicle flywheels and clutches.

BACKGROUND OF THE INVENTION

Vehicle flywheels and clutches, particularly those incorporated within large truck engines and power transmissions are typically difficultly installed and de-installed. A major factor contributing to such difficulty constitutes the typical extreme heaviness and weight of truck flywheels and clutches. Another factor contributing to such difficulty arises from the close space constraints, typically behind a truck’s engine, beneath the truck’s cab, and between the truck’s chassis rails, within which flywheel or clutch installations and de-installations must be performed. The instant inventive flywheel and clutch lift assists in installations and de-installations of such heavy truck flywheels and clutches within such tightly constrained spaces by providing a sit-down style mechanic’s floor creeper which includes and incorporates a flywheel and clutch lifting and positioning mechanism.

BRIEF SUMMARY OF THE INVENTION

A major structural component of the instant inventive flywheel and clutch lift comprises a mechanic’s floor creeper base or foundation. Preferably the mechanic’s floor creeper includes four rolling casters and is of the “sit-down” type or style, facilitating use by a seated mechanic as opposed to a supinely positioned mechanic.

A further structural component of the instant inventive flywheel and clutch lift comprises a boom arm which is preferably moveably mounted upon an upper surface of the mechanic’s floor creeper base. Preferably the boom arm is pivotally mounted for movement between a first horizontal and retracted position and second upwardly extended positions. Pivoting means are preferably operatively connected to the boom arm and to the mechanic’s floor creeper, the pivoting means being adapted for actuating the boom arm in its pivoting motions between such first and second positions. Preferably the pivoting means comprises a hydraulic cylinder or ram. Suitably, the pivoting means may alternatively comprise a pneumatic cylinder or ram, a jack screw assembly, or other commonly known mechanical means for inducing pivoting motions.

A further structural component of the instant inventive flywheel and clutch lift comprises extending and telescoping means incorporated within and connected operatively to the preferably pivoting boom arm. Preferably such means comprises a quill and shaft configuration of the boom arm and further comprises a hydraulic cylinder linear actuator. Suitably, other commonly known linear actuators such as jack screws or pneumatic cylinders may be substituted.

A further structural component of the instant inventive flywheel and clutch lift comprises an adapter for removably mechanically connecting a flywheel or a clutch to the distal or upper end of the boom arm element.

In use of the instant inventive flywheel and clutch lift a mechanic may advantageously seat himself or herself upon a seating portion of the mechanic’s floor creeper while the mechanic’s floor creeper is situated and positioned within a space beneath a truck’s cab, the space being behind the truck’s crank shaft power output linkage, and being between the truck’s main chassis rails. While so seated and positioned the mechanic may easily and conveniently utilize the lift’s flywheel or clutch lifting mechanism for correctly positioning a flywheel or clutch for installation.

Accordingly, objects of the instant invention include the provision of a flywheel or clutch lift mechanism which incorporates as its base structure a mechanics floor creeper.

Other and further objects, benefits, and advantages of the instant invention have been discussed above and will become further known to those skilled of the art upon review of the detailed description which follows, and upon review of the appended drawings.

STATEMENT REGARDING CHARACTER OF DRAWINGS

The drawings described below are photographic in character, and the Applicant does not petition for the allowance of photographic drawings. Notwithstanding, the Applicant asserts that the drawings are such that the prosecution can be carried out without the submission of corrected drawings showing the depicted structures in black lines only. It is, therefore, permissible pursuant to MPEP §608.02(b) that the drawings be admitted for examination purposes only. Accordingly, the Applicant requests under MPEP §608.02(b) that the drawings be admitted for examination purposes only.

DETAILED DESCRIPTION OF A PREFERRED EMBODIMENT

Figure 1:
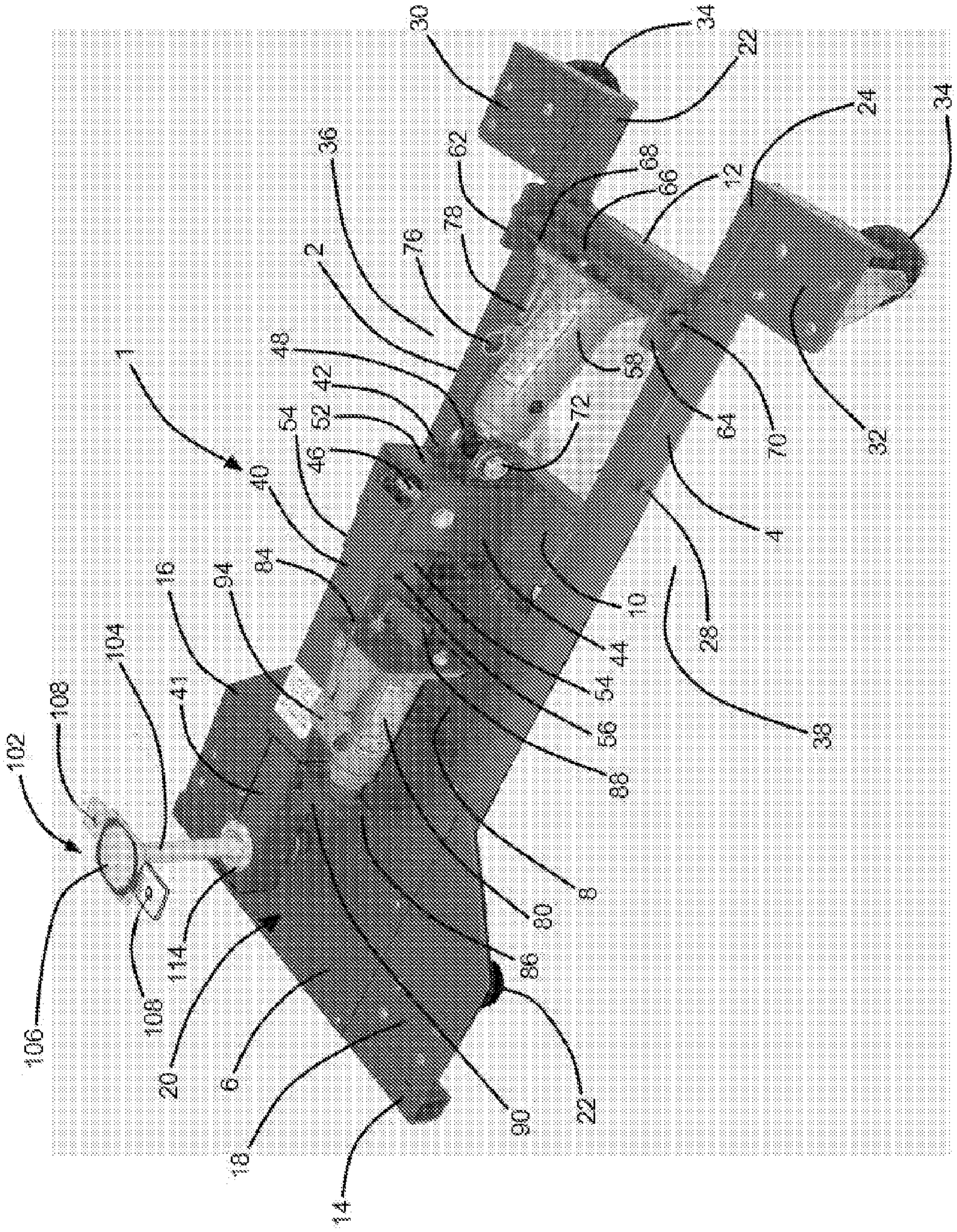
FIG. 1 is a perspective view of a preferred embodiment of the instant inventive flywheel and clutch lift.

Referring now to the drawings, and in particular to FIG. 1, a preferred embodiment of the instant inventive flywheel and clutch lift is referred to generally by Reference Arrow 1. The base or foundational structure of the flywheel and clutch lift 1 preferably comprises a mechanic's sitting position floor creeper which preferably comprises left and right chassis beams 2 and 4. Each of the left and right chassis beams 2 and 4 preferably comprises hollow bored steel square tubing. The left and right chassis beam components 2 and 4 of the mechanic's floor creeper base of the instant inventive lift, are preferably rigidly laterally interconnected by a series of cross members 6, 8, 10, and 12. The rearmost cross member 6 is preferably configured to function as a seat plate, and the cross member 8 immediately forward of such rearmost cross member 6 is preferably configured as an upwardly opening "C" channel for advantageous service as a parts and tool tray. A "T" bar 14 is preferably rigidly welded to the rearward ends of the left and right chassis beams 2 and 4, such "T" bar 14 supporting the rearmost edge of the seat plate 6.

Figure 4:
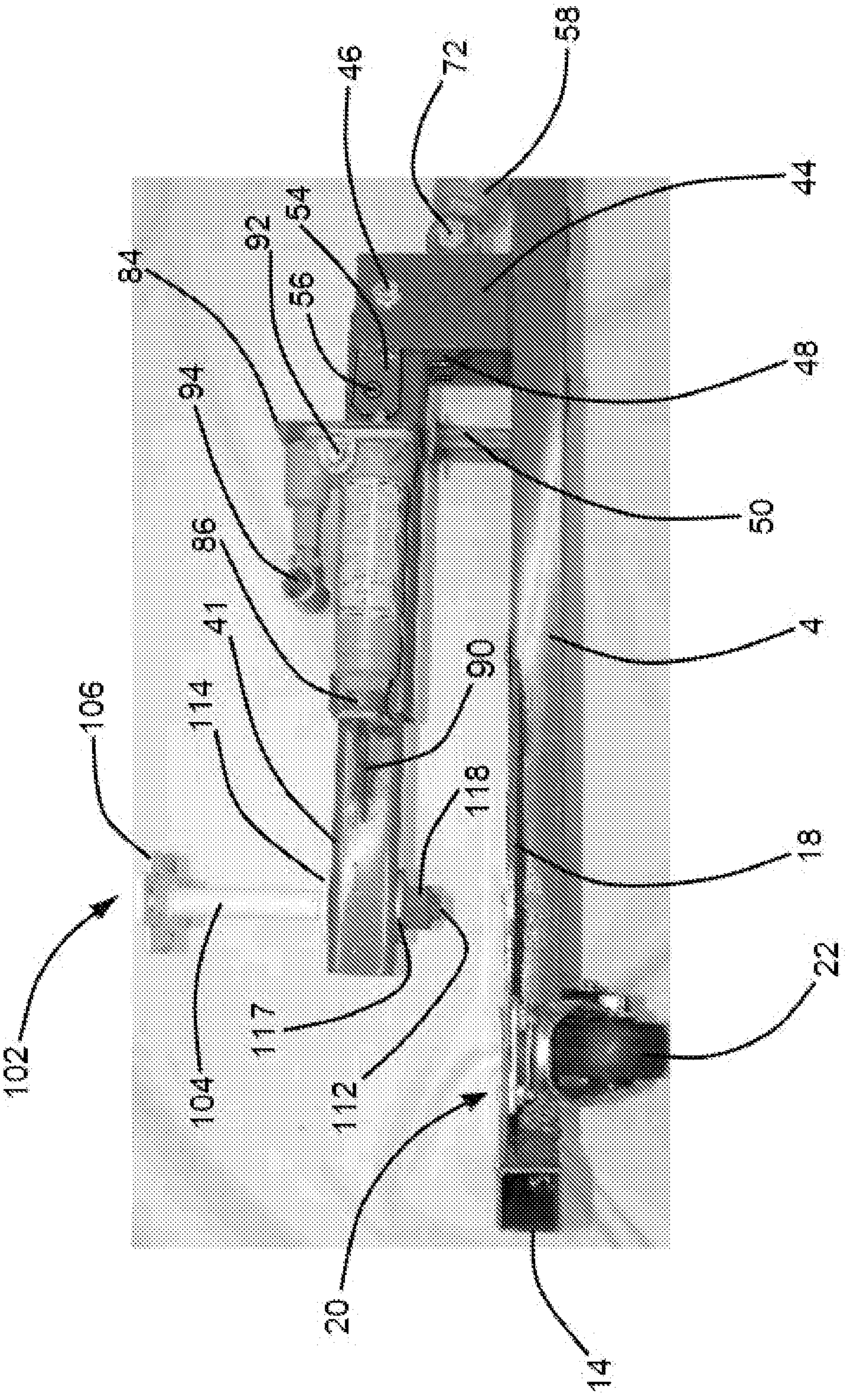
FIG. 4 is a side view of a portion of the mechanism depicted in FIG. 1.

Referring simultaneously to FIGS. 1 and 4, left and right seat extension flanges 16 and 18 are preferably respectively welded to the "T" bar 14 and respectively to the left and right chassis rails 2 and 4. So positioned, the left and right seat plates 16 and 18 advantageously perform triple functions of widening and completing a mechanic's seating surface which is referred to generally by Reference Arrow 20, providing enhanced lateral width and stability to the mechanic's floor creeper base, and providing convenient overlying mounting surfaces for the creeper's rear caster wheels 22.

Figure 9:
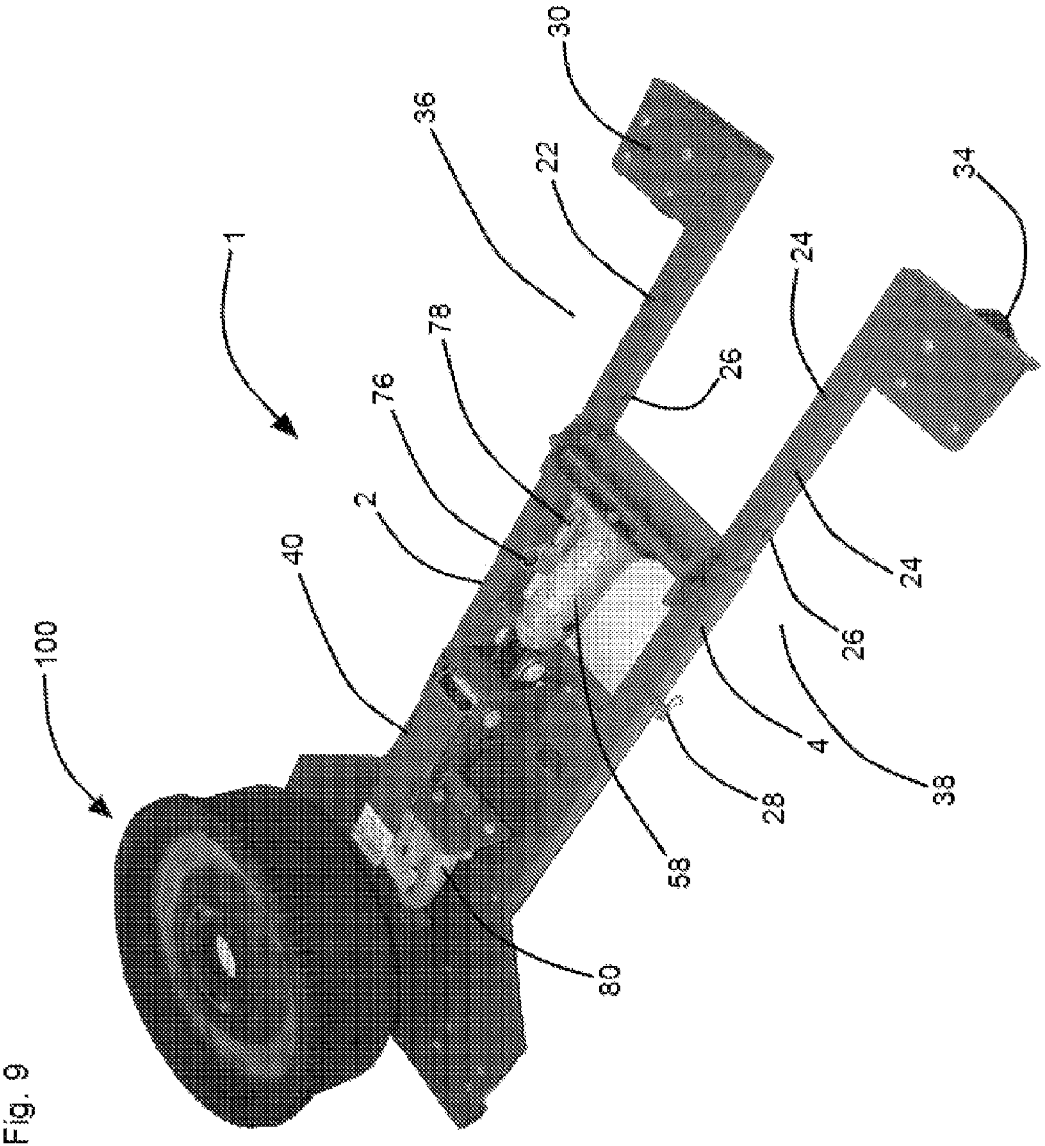
FIG. 9 redepicts FIG. 1, the view of FIG. 9 showing the flywheel attached.

Referring simultaneously to FIGS. 1 and 9, the left and right chassis beams 2 and 4 preferably open forwardly for respective slidable receipts of left and right chassis extension beams 22 and 24. Preferably, the left and right chassis extension beams 22 and 24 are telescopingly movable between first retracted positions as depicted in FIG. 1 for purposes of compactness, and second extended positions, as depicted in FIG. 9, for purposes of enhanced longitudinal stability of the lift 1. Preferably, the left and right chassis beams 2 and 4 and the left and right chassis extension beams 22 and 24 include series of alignable eyes 26 which are capable of receiving laterally extending sheer pins 28 for selectively locking the extension beams 22 and 24 in their first retracted or second extended positions.

Referring further to FIGS. 1 and 9, left and right caster mount plates 30 and 32 are preferably fixedly welded to the left and right chassis extension beams 22 and 24, such plates 30 and 32 performing triple functions of providing enhanced lateral stability to the forward end of the mechanic's floor creeper component, providing overlying mounting surfaces for front caster wheels 34, and providing slide stops which prevent hyper-retraction of extension beams 22 and 24.

Figure 10:
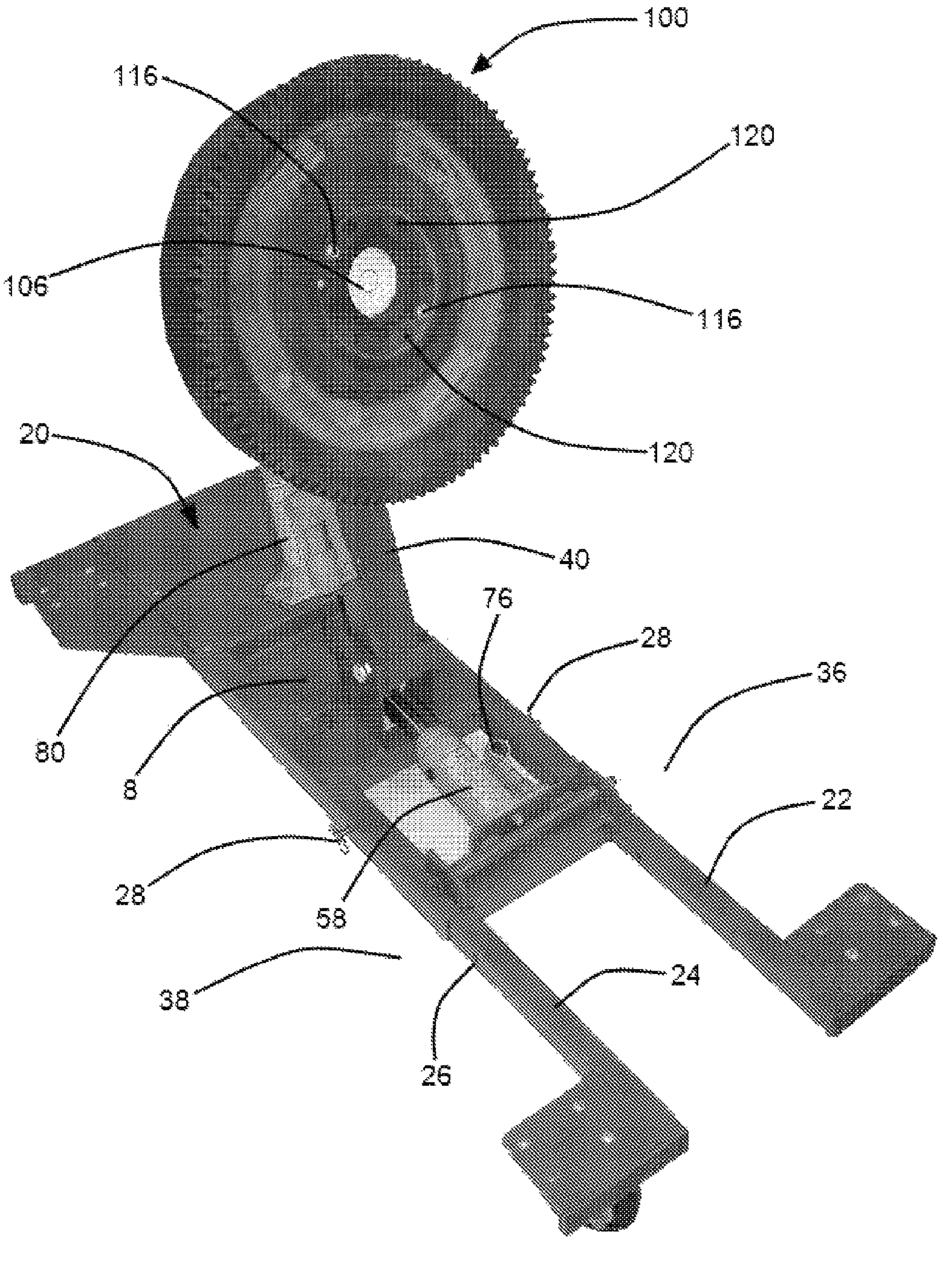
FIG. 10 redepicts FIG. 9, the view of FIG. 10 alternatively showing the boom arm and attached flywheel upwardly extended.

Referring further simultaneously to FIGS. 1 and 9, the rearwardly positioned left and right seat plates 16 and 18, in combination with the forwardly positioning caster mounting plates 30 and 32, advantageously respectively define left and right laterally opening voids or inset spaces 36 and 38. Such spaces 36 and 38 ergonomically allow a mechanic seated upon the seating surface 20 (upon upward extension of boom arm 40 as depicted in FIG. 10) to extend his or her left and right legs downwardly through the spaces 36 and 38 for contact with the floor. With feet so positioned and extended, such seated mechanic may easily, through leg motions and manipulations, pivot the creeper leftwardly or rightwardly or may move the creeper forwardly or rearwardly.

Referring to FIG. 1, the boom arm 40 preferably comprises a hollow bored steel square tube. The lower end of the boom arm 40 is preferably pivotally mounted to the mechanic's floor creeper component via a pin, eye, and clevis assembly, such assembly preferably comprising left and right clevis ears 42 and 44, and a clevis pin 46 which extends laterally through eyes within ears 42 and 44 and through aligned eyes within the lower or proximal end of boom arm 40. A pivotal motion actuating lever arm 48 is preferably fixedly welded to the lower end of the boom arm 40, such lever arm 48 being positioned between and extending forwardly from the clevis ears 42 and 44.

Figure 5:
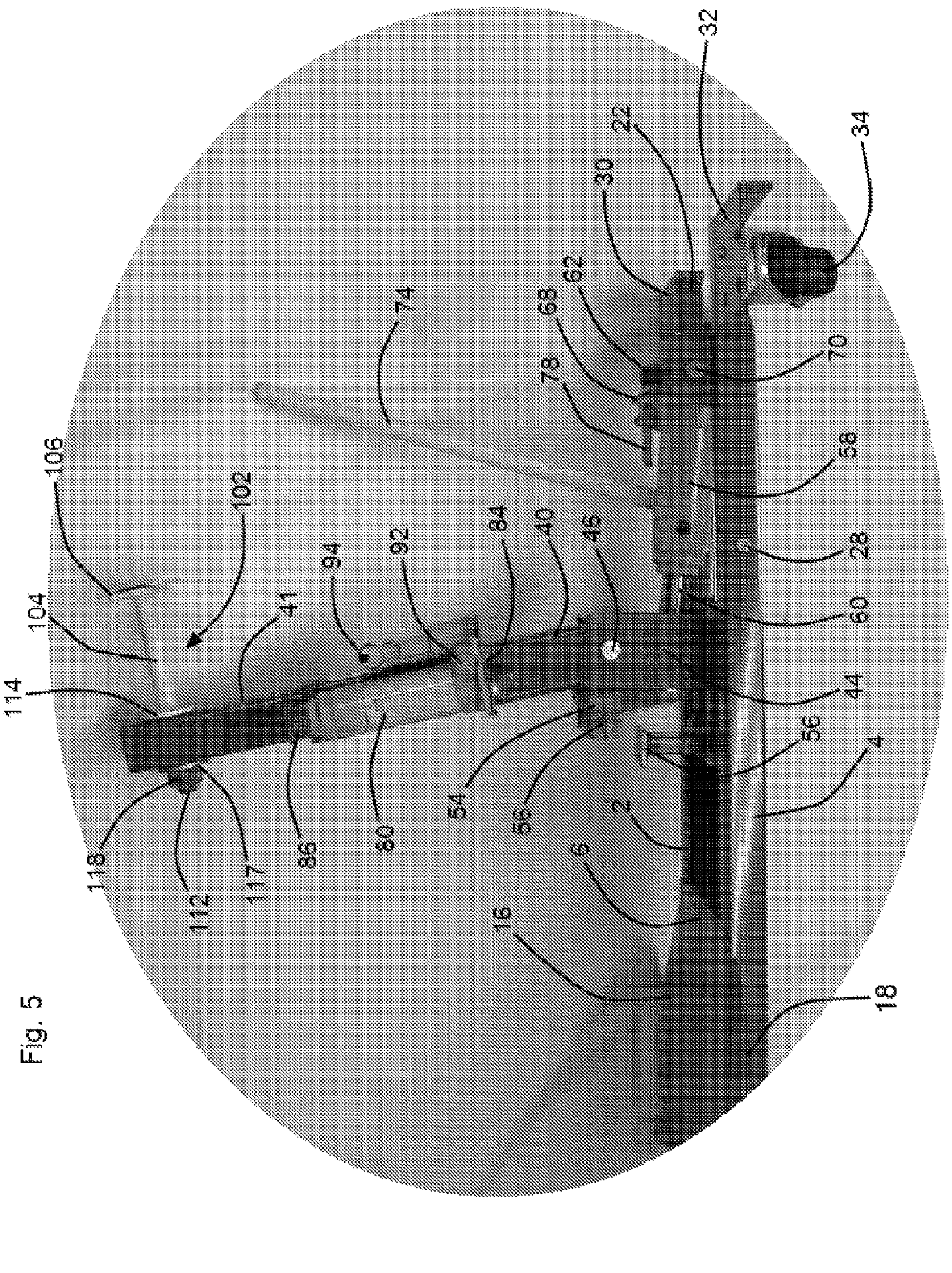
FIG. 5 redepicts FIG. 4, the view of FIG. 5 showing the mechanism’s boom arm in an extended position.

Referring to FIG. 1, pivot stops 50, 52, and 54 are preferably associated with the boom arm 40, pivot stop 50 preventing hyper-retraction of the boom arm 40 toward the seat 20 from the stopped position depicted in FIG. 1, and pivot stop 52 preventing any forward hyper-extending movement of the boom arm 40. Referring further to FIG. 5, a third pivot stop 54 consisting of left and right shear pin receiving ears may advantageously function as a safety which locks the boom arm 40 in its upwardly extended orientation upon lateral insertion of a lock pin (not depicted) through eyes 56.

Figure 3:
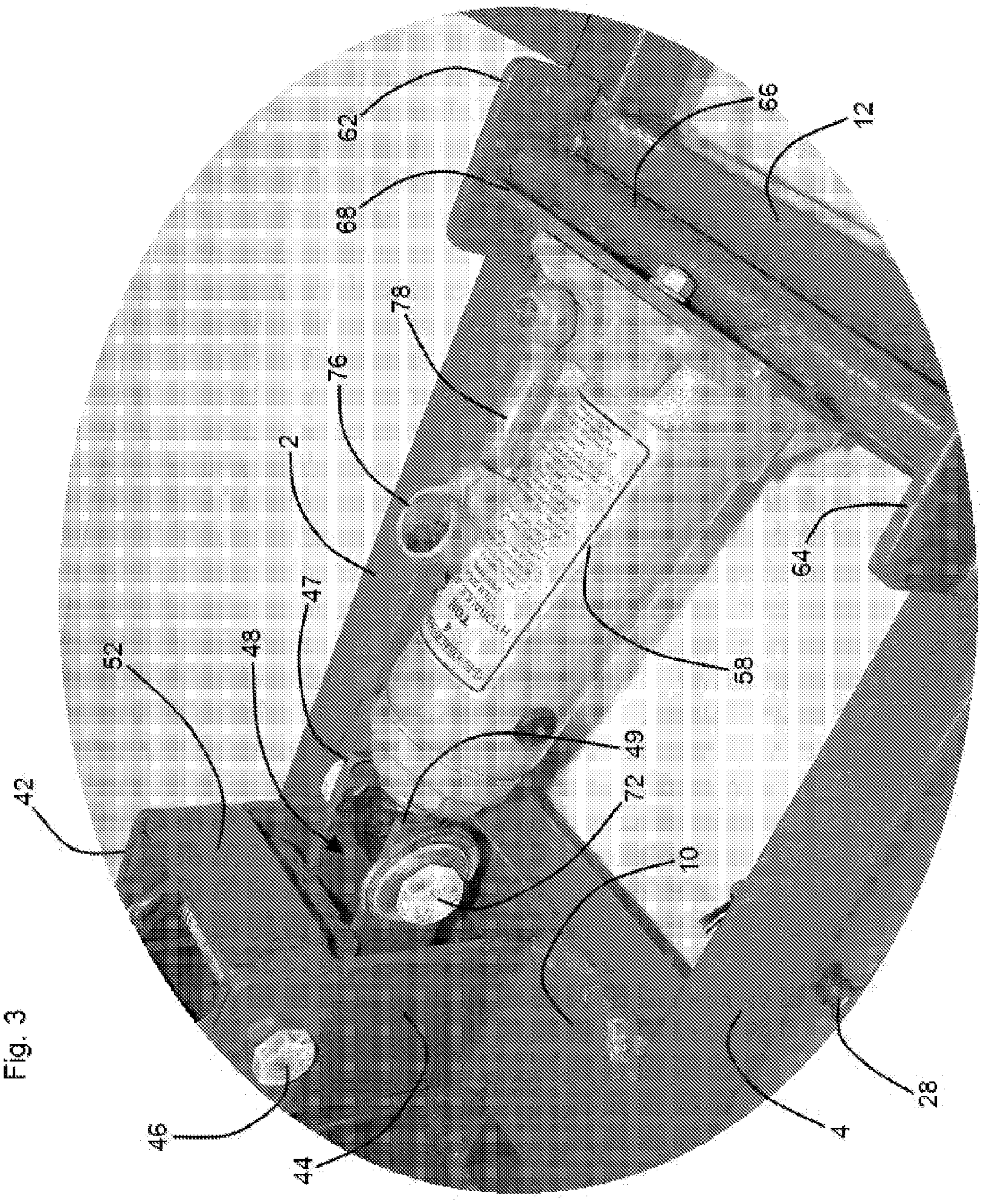
FIG. 3 is a magnified view of an alternate portion of the mechanism depicted in FIG. 1.

Referring simultaneously to FIGS. 1, 3, and 5, the boom arm 40 is preferably moveable between the rearwardly retracted compact storage position which is depicted in FIG. 1, to an upwardly extended position depicted in FIG. 5. Means for pivoting the boom arm between such retracted and extended positions are preferably provided, such means preferably comprising a one-way hydraulic cylinder 58, such cylinder having an extendable and retractable piston rod 60. Preferably, the base of the preferred hydraulic cylinder 58 is pivotally mounted upon the forward end of the mechanic's floor creeper base via a pivoting assembly including left and right clevis ears 62 and 64, an axle sleeve 66, a mounting plate 68 fixedly welded to the axle sleeve 66, and an axle pin 70 extending laterally through eyes within the clevis ears 62 and 64 and extending through the bore of axle sleeve 66.

Referring further simultaneously to FIGS. 1, 3, and 5, and referring in particular to FIG. 3, boom arm actuating lever 48 is preferably configured as left and right clevis ears 47 and 49, such ears 47 and 49 receiving the distal end of the piston rod 60 of the hydraulic cylinder 58. Clevis pin 72 preferably pivotally interconnects the lever arm 48 and such piston rod distal end, such pin 72 completing a triple pivot actuation linkage including pins 46 and 70. In order to actuate the boom arm 40 for upward pivoting motion, a pump lever 74 may be inserted into lever receptacle 76 and pressure relief valve lever 78 may be moved to its closed position, as depicted in FIG. 3. Thereafter, manually rocking action applied to lever 74 may actuate the hydraulic cylinder 58 to pivotally move the boom arm 40 from the retracted position depicted in FIG. 1, to the exemplary upwardly extended position depicted in FIG. 5.

Figure 2:
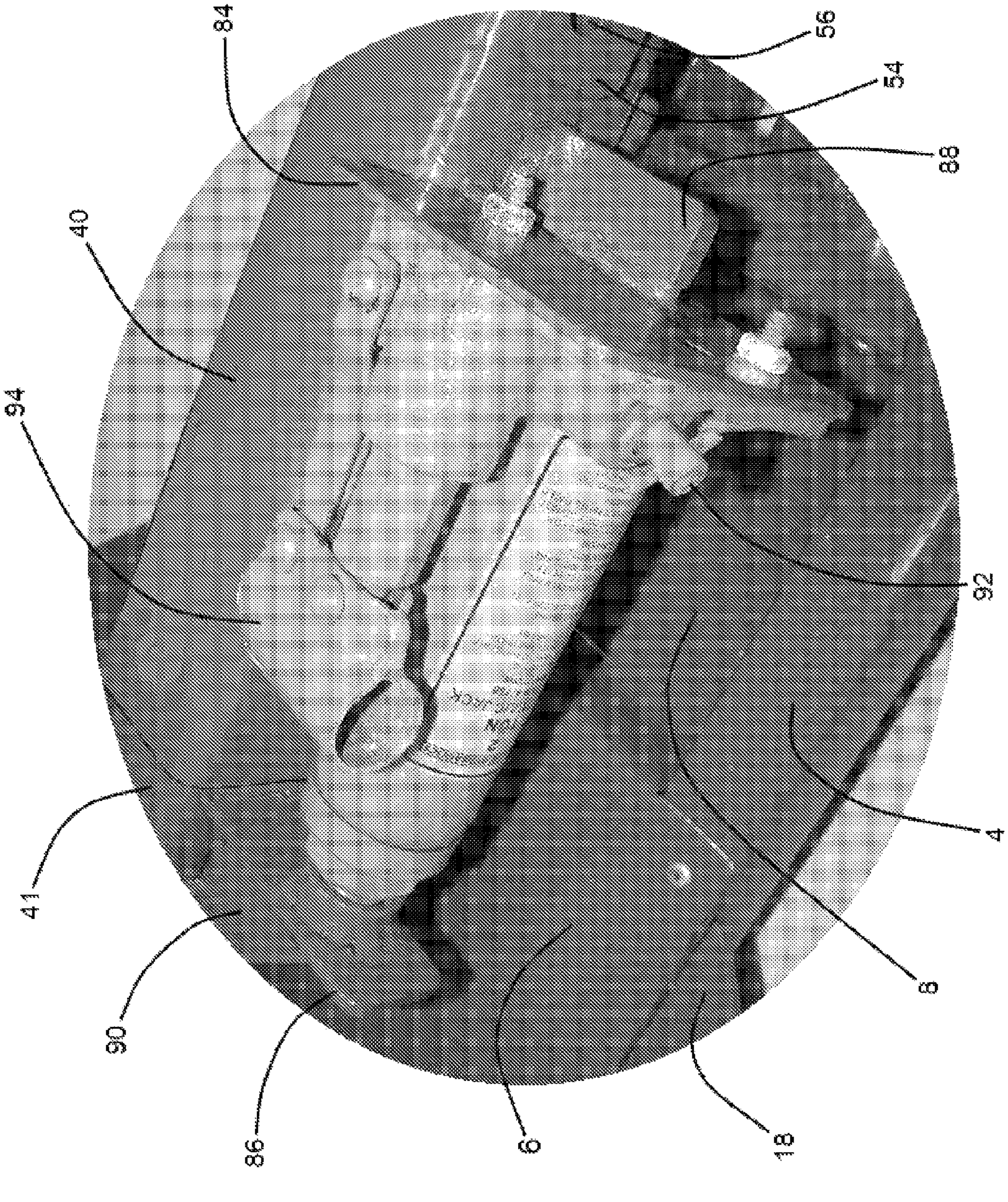
FIG. 2 is a magnified view of a portion of the mechanism depicted in FIG. 1.

Referring simultaneously to FIGS. 1, 2, and 4, the distal or upper end of the boom arm 40 preferably includes an opening for sliding receipt of a boom extension arm 41, such arm 41 preferably being telescopingly extendable and retractable with respect to the boom arm 40 in the manner of a quill and shaft assembly. Linear actuating means preferably operatively span between the boom arm 40 and to the boom extension arm 41, such means preferably comprising a second one-way hydraulic cylinder 80, such cylinder 80 having, referring further to FIG. 6, a piston rod 82. The second hydraulic cylinder 80 is preferably mounted between a cylinder mounting plate 84 and a bearing plate 86, the mounting plate 84 being fixedly welded to the boom arm 40 and the bearing plate 86 being fixedly welded to the boom extension arm 41. Preferably, triangulating gusset plates 88 and 90 are welded in place for respectively structurally stiffening the mounting plate 84 and the bearing plate 86.

Figure 6:
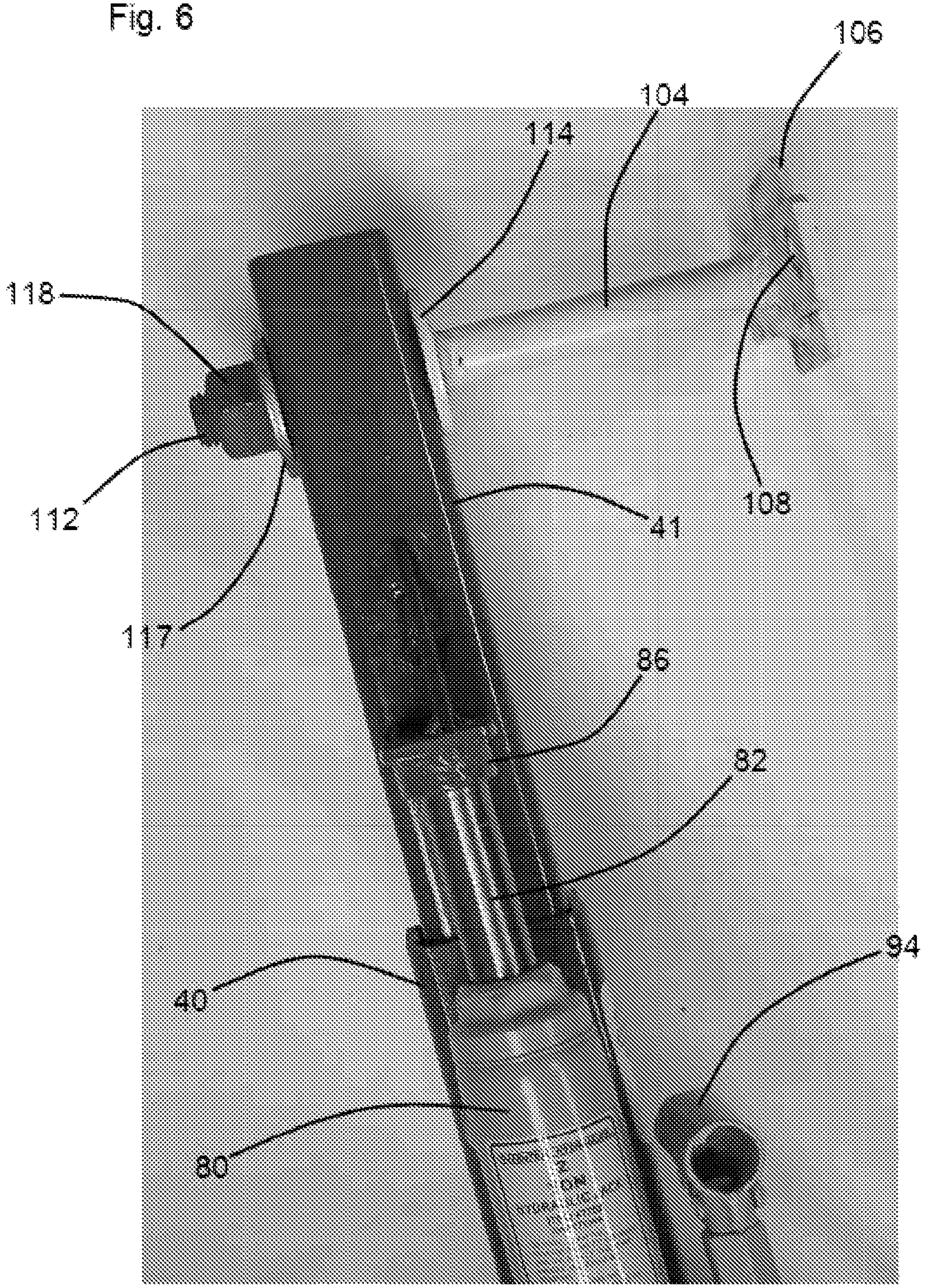
FIG. 6 is magnified view of the upper end of the boom arm depicted in FIG. 5, the view of FIG. 6 showing the distal end of the boom arm alternatively upwardly extended.

Referring simultaneously to FIGS. 2, 5, and 6, the boom extension arm 41 may be moved from the downwardly retracted position depicted in FIG. 5, to an exemplary upwardly extended position, as depicted in FIG. 6, by manually turning relief valve 92 to its closed position, by alternatively inserting lever 74 into the lever receptacle 94 of cylinder 80, and by manually rocking such lever 74 to cause the second hydraulic cylinder 80 to drive its piston rod 82 upwardly against bearing plate 86. Accordingly, operation of the second cylinder 80 may upwardly move the boom extension arm 41 to the exemplary extended position depicted in FIG. 6.

Figure 7:
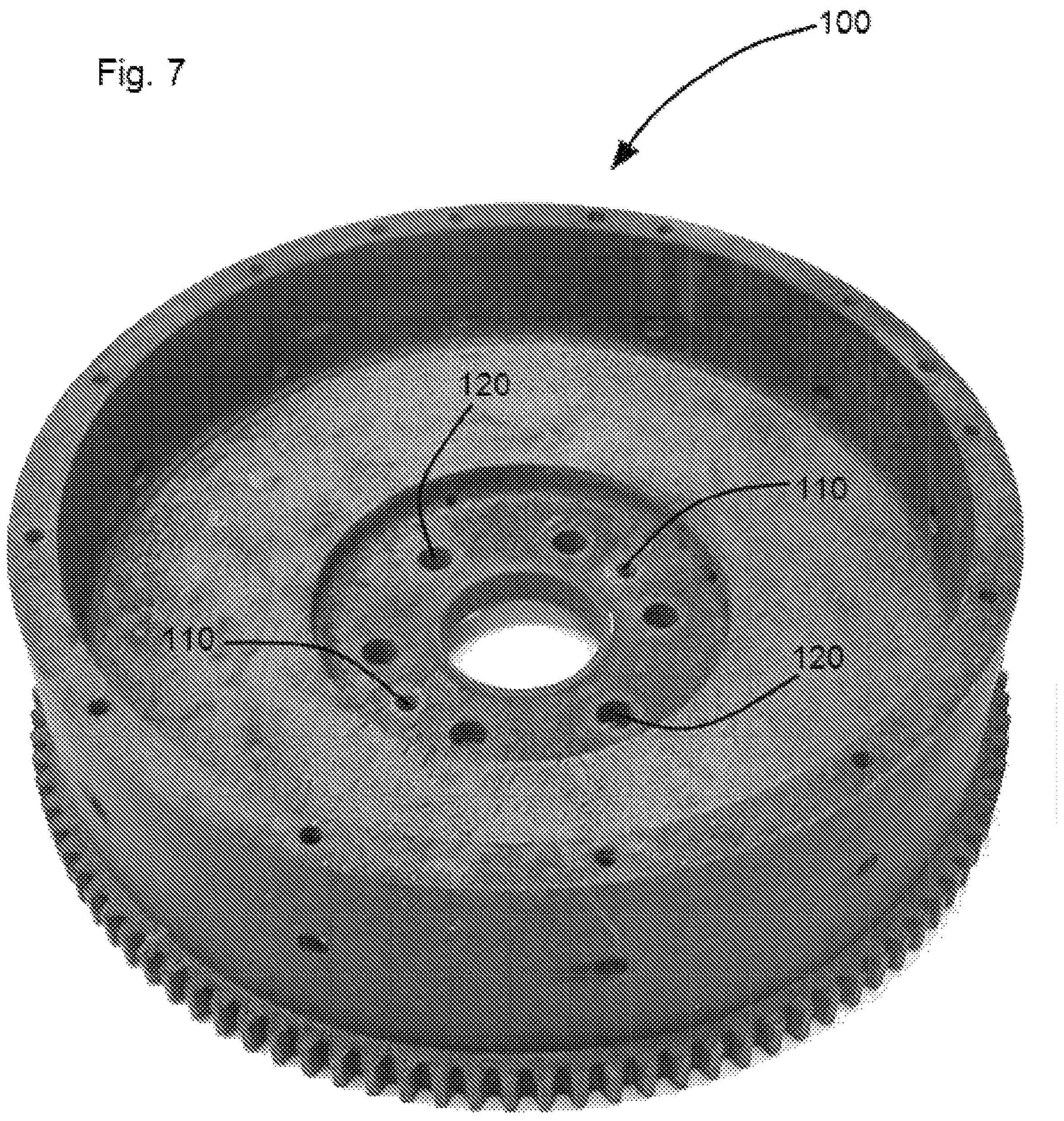
FIG. 7 depicts a truck flywheel.
Figure 8:
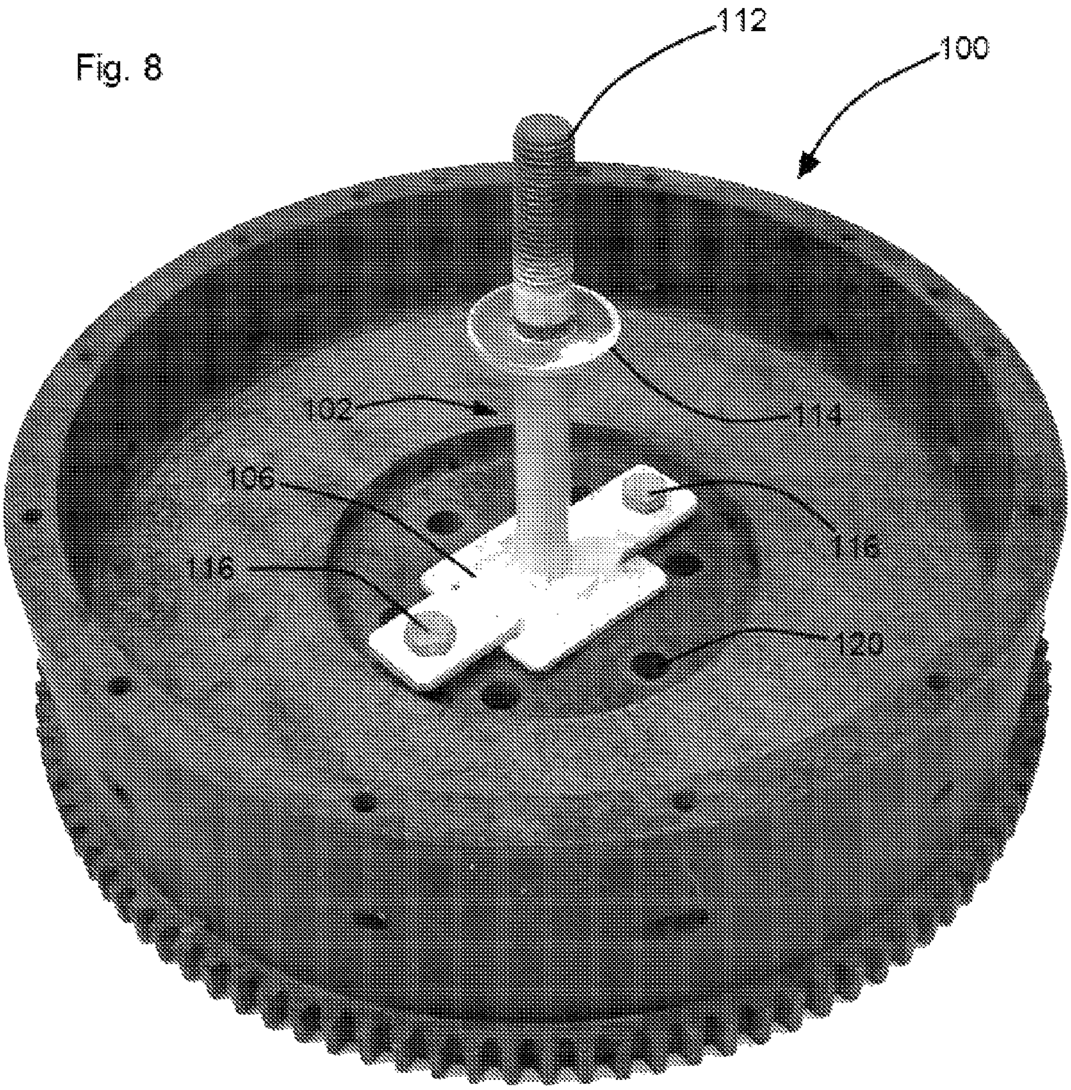
FIG. 8 redepicts FIG. 7, the view of FIG. 8 showing a “T” adapter attached.

Referring simultaneously to FIGS. 1, 7, and 8, the instant inventive lift 1 may be advantageously utilized for installation of an exemplary truck flywheel which is referred to generally by Reference Arrow 100. Such flywheels 100 are, when installed as a component of a truck power train, typically bolted to an exposed power output linkage of the truck's engine crank shaft (not depicted). In order to utilize the lift 1 in assistance of such flywheel installation, a mechanic may utilize a "T" adapter which is referred to generally by Reference Arrow 102, such adapter preferably comprising a cantilevering shaft 104 and a "T" plate 106 having a pair of mounting bolt receiving apertures 108. Preferably, the mounting bolt receiving apertures 108 are positioned so that they may overlie and align with a pair of helically threaded apertures 110, such apertures commonly being present within truck flywheels. Referring further simultaneously to FIG. 4, the proximal end of the cantilevering shaft 104 preferably presents helical threads 112, and the diameter of the shaft 104 at its threaded end is preferably closely fitted for, referring further to FIG. 12, extension through a shaft receiving aperture 39 within the distal end of the boom extension arm 41. A stop collar 114 is preferably fixedly welded to shaft 104 for stopping and positioning the "T" adapter 102 in the cantilevered orientation depicted in FIG. 4. Upon abutting positioning of the "T" plate 106 of the "T" adapter 102 against the flywheel depicted in FIG. 8, and upon radially positioning the bolt receiving apertures 108 to overlie and align with helically threaded apertures 110, helically threaded bolts 116 may be extended therethrough for threaded engagements with apertures 110. Thereafter, referring further simultaneously to FIG. 9, the mechanic may manually lift and invert the flywheel 100 and "T" adapter 102 assembly, positioning such assembly so that shaft 104 and its helically threaded proximal end 112 downwardly point for extension through aperture 39 within the distal end of the boom arm extension shaft 41. Such downward extension may continue until extreme proximal end of the threaded shaft 112 protrudes downwardly from the extension shaft 41, and until stop 114 abuts the extension arm 41. Upon assembling such configuration, pivot stop 50 advantageously bears the weight of the flywheel 100 and "T" adapter 102 assembly, such stop preventing the extreme proximal end of the threaded shaft 112 from impinging against the upper surface of the seat 20. Thereafter, the mechanic may upwardly extend a washer 117 over the threaded shaft 112, and a helically threaded nut 118 may thereafter be threadedly mounted thereover to secure the flywheel 100 and "T" adapter 102 assembly upon the distal end of the boom extension arm 41.

Referring simultaneously to FIGS. 1 and 9, upon mounting the flywheel 100 and "T" adapter 102 assembly upon the distal end of the boom extension arm 41, as depicted in FIG. 9, the mechanic may extract locking sheer pins 28 and may slide chassis extension beams 22 and 24 to their forwardly extended positions as depicted in FIG. 9. Thereafter, the locking sheer pins 28 may be re-inserted into eyes 26 to alternatively lock the chassis extension beams 22 and 24 at their longitudinally stabilized positions depicted in FIG. 9. Thereafter, the lift assembly 1 may be rolled upon a mechanic's shop floor to a position substantially underlying an exposed truck engine crank shaft power output plate (not depicted) and substantially between the truck's main chassis rails (also not depicted). Typically, the vertical profile of the lift 1 and flywheel 100 will permit such rolling motion to such underlying position. Thereafter, referring further simultaneously to FIGS. 5 and 10, pump lever 74 may be engaged with the receptacle 76 of the first hydraulic cylinder 58, and such cylinder 58 may be actuated thereby to pivotably raise the boom arm 40, boom extension arm 41, "T" adapter 102, and flywheel 100 assembly from the retracted position depicted in FIG. 9 to the exemplary raised position depicted in FIG. 10.

Upon such raising of such boom arm and flywheel assembly depicted in FIG. 10, to a position between the main chassis rails of a truck as described above, the mechanic may bodily enter the space between such truck chassis rails, and may seat himself or herself upon the seat surface 20 with left and right feet positioned substantially within spaces 36 and 38 and upon the shop floor. Thereafter, such mechanic may, through foot and leg motions, rollably move or rotate the inventive lift 1, along with the attached flywheel 100, to an orientation wherein the flywheel's rotational axis lies substantially within the vertically and longitudinally extending plane which includes the rotational axis of the truck's crank shaft. Thereafter, the mechanic may further move the lift 1 to a position wherein the longitudinal orientation of the flywheel's crank shaft mounting apertures 120 substantially matches those of the truck engine's crank shaft power output linkage. In order to achieve a suitable vertical alignment of the flywheel 100, such mechanic may thereafter, referring further to FIG. 5, re-engage lever handle 74 with receptacle 94 of the second hydraulic cylinder 80 to operate cylinder 80 to raise extension arm 41, the "T" adapter 102, and flywheel 100 assembly to an elevation wherein the flywheels mounting apertures 120 substantially matches those of such truck engine crank shaft power output linkage. In many cases, such truck engines, along with their crank shafts and crank shaft power linkages, are canted rearwardly at a slight angle from horizontal. In order to cause the rotational axis of the flywheel 100 to match such canted crank shaft angle, the first hydraulic cylinder 58 may be operated by the mechanic to angularly position the boom arm 40 and the boom extension arm 41 at a substantially matching angle. Finally, the operator may adjustingly rotate the flywheel 100 and the "T" adapter 102 about their rotational axes until the flywheel's crank shaft mounting apertures 120 radially align with corresponding mounting apertures of the engine's crank shaft power output linkage.

Upon utilization of the lift 1 in assistance of the above described flywheel alignments the flywheel 100 will have become precisely oriented and aligned for receipts of six flywheel mounting bolts (not depicted) through the flywheel's six mounting apertures 120. During the flywheel installation process, such mounting bolts, along with an appropriate wrench, may be advantageously stored for easy access within the tray cross member 8.

Disassembly of the flywheel 100 may be accomplished via reversal of installation steps described above. Referring simultaneously to FIGS. 7, 8 and 10, it may be seen that the length of bolts 116 is preferably sufficient to allow their forward or distal ends to protrude forwardly from the flywheel's threaded apertures 110. Such preferred capacity for forward protrusion advantageously allows the bolts 116 to act, upon use of the lift 1 for flywheel disassembly, as jack screws capable of breaking the flywheel 100 away from such engine's crank shaft power linkage.

Figure 11:
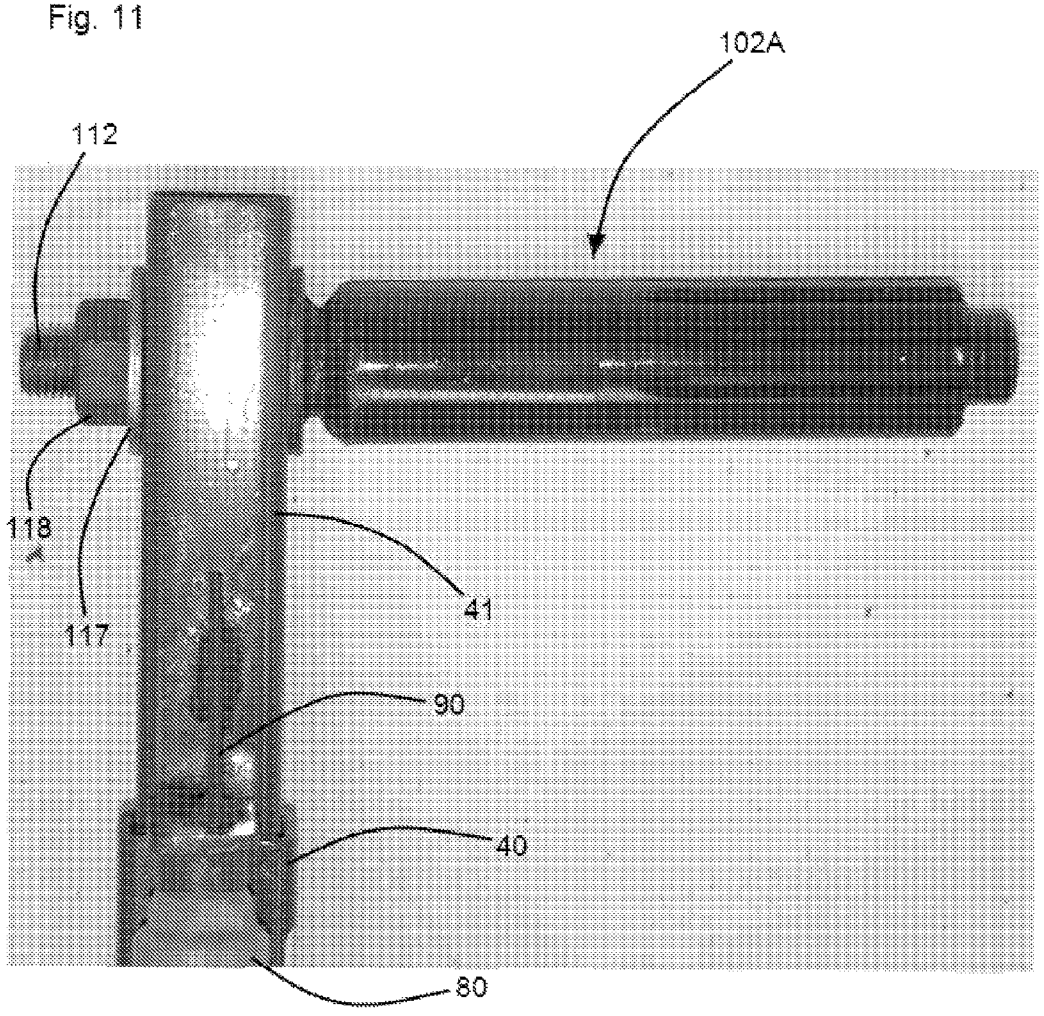
FIG. 11 redepicts FIG. 6, the view of FIG. 11 alternatively replacing the “T” adapter with a clutch carrying adapter.

Referring to FIG. 11, a clutch holding adapter 102A is shown alternatively mounted upon the distal end of the boom extension arm 41; FIG. 11 representing the instant invention's further capacity for assistance in installations and de-installations of truck clutches.

Figure 12:
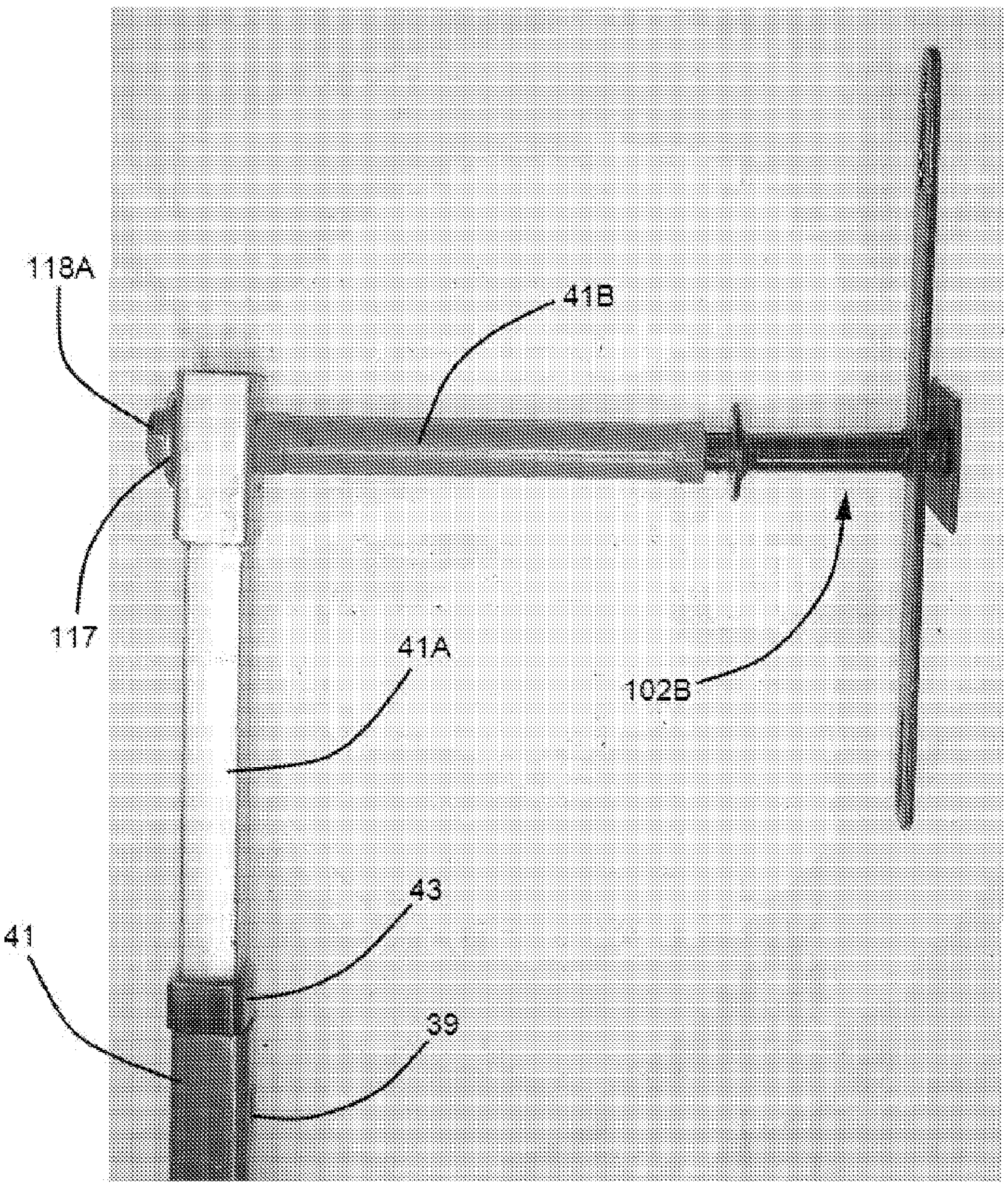
FIG. 12 alternatively redepicts FIG. 6, the view of FIG. 12 showing an alternatively sized "T" adapter along with interlinking extension segments.

Referring to FIG. 12, an extension segment 41A of the boom extension arm 41 is depicted, the extension segment 41A being mounted upon the boom extension arm 41 in the manner of a slidably connected pin and socket joint. The boom extension arm's sliding receipt of the extension segment 41A is preferably stopped by stop collar 43 which is preferably fixedly welded to the extension segment 41A. Where the exemplary truck discussed above rests upon a jack stand, use of the extension segment 41A may allow, referring further to FIGS. 1 and 10, the lift 1 to sufficiently raise the flywheel 100.

Referring further simultaneously to FIGS. 1 and 12, a larger "T" adapter 102B may be alternatively utilized for installing or deinstalling larger truck flywheels. Also alternatively, a longitudinal extension segment 41B attached by bolt 118 may provide needed positioning flexibility for installation or deinstallation of variously configured truck flywheels and clutches.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A mechanical lift for raising, lowering, and positioning a vehicle flywheel or a vehicle clutch assembly, the mechanical lift compromising:

(a) a base, the base comprising a rollable floor creeper;

(b) a boom arm mounted upon the base for motion between first and second positions, the boom arm extending upwardly from the base while in the second position, the boom arm being positioned downwardly from the second position while in the first position;

(c) pivoting means connected operatively to the boom arm, the pivoting means being adapted for moving the boom arm between the first and second positions;

(d) telescoping means connected operatively to the boom arm; and (e) an adapter fixedly attached to the boom arm; the base comprising a seat, the seat being positioned so that the boom arm, upon movement to the second position extends upwardly and forwardly from the seat.

2. The mechanical lift of claim 1 wherein the base further comprises a plurality of rollable casters.

3. The mechanical lift of claim 2 wherein the base further comprises left and right chassis beams, and left and right chassis extension beams, the left and right chassis extension beams being respectively telescopingly mounted upon the left and right chassis beams.

4. The mechanical lift of claim 2 wherein the base further comprises a parts and tools tray.

5. The mechanical lift of claim 2 wherein the boom arm, upon movement to the first position, extends substantially horizontally over the base.

6. The mechanical lift of claim 5 wherein the pivoting means comprises a hinge.

7. The mechanical lift of claim 6 wherein the hinge comprises a pin, eye, and clevis assembly.

8. The mechanical lift of claim 6 wherein the pivoting means further comprises a hydraulic cylinder.

9. The mechanical lift of claim 8 wherein the hydraulic cylinder is adapted for one-way powered actuation.

10. The mechanical lift of claim 2 wherein the telescoping means comprises an extension arm mounted slidably upon the boom arm.

11. The mechanical lift of claim 10 where the telescoping means further comprises a hydraulic cylinder connected operatively to the extension arm.

12. The mechanical lift of claim 11 wherein the hydraulic cylinder is adapted for one-way powered actuation.

13. The mechanical of claim 2 wherein the adapter is selected from the group consisting of flywheel engaging adapters and clutch holding adapters.

14. The mechanical lift of claim 2 wherein the base's seat comprises rearwardly positioned left and right seat plates.

15. The mechanical lift of claim 14 wherein the base further comprises forwardly positioned left and right caster mounting plates.

16. The mechanical of claim 15 wherein the left and right seat plates in combination with the left and right caster mounting plates respectively define left and right leg receiving inset spaces.

* * * * *